United States Patent [19]

Berchem

[11] Patent Number: 4,968,004
[45] Date of Patent: Nov. 6, 1990

[54] SHUTOFF AND CONTROL VALVE

[75] Inventor: Rütger Berchem, Essen, Fed. Rep. of Germany

[73] Assignee: Metalpraecis Berchem - Schaberg Gesellschaft fur Metallformgebung MBH, Gelsenkirchen, Fed. Rep. of Germany

[21] Appl. No.: 400,244

[22] Filed: Aug. 29, 1989

[30] Foreign Application Priority Data

Aug. 31, 1988 [DE] Fed. Rep. of Germany ....... 3829506

[51] Int. Cl.$^5$ ............................................. F16K 43/00
[52] U.S. Cl. ..................................... 251/368; 137/315
[58] Field of Search ................. 251/315, 368; 137/375

[56] References Cited

U.S. PATENT DOCUMENTS

| 3,264,718 | 8/1966 | Paul, Jr. | 251/368 |
| 3,463,449 | 8/1969 | Nelson et al. | 251/315 |
| 4,006,881 | 2/1977 | Gaillard | 251/315 |
| 4,133,348 | 1/1979 | Spitz | 251/368 |
| 4,337,920 | 7/1982 | Parris | 251/368 |
| 4,763,876 | 8/1988 | Oda et al. | 251/368 |

Primary Examiner—A. Michael Chambers
Attorney, Agent, or Firm—Herbert Dubno

[57] ABSTRACT

A valve in which the movable valve member, e.g. a ball or slider, has at least one valve seat braced thereagainst and is composed of an engineering ceramic which differs from the engineering ceramic of the valve seat with the two ceramics being paired to reduce adhesion between them. One of the ceramics can be an oxide ceramic while the other is a nitride or carbide ceramic or one can be a nitride ceramic while the other is a carbide ceramic.

14 Claims, 3 Drawing Sheets

SHUTOFF AND CONTROL VALVE

CROSS REFERENCE TO RELATED APPLICATIONS

This application is related to the commonly assigned copending applications:

| U.S. Ser. No. | Filed |
| --- | --- |
| 07/307,383 | 6 Feb. 1989 |
| 07/316,755 | 28 Feb. 1989 |

In addition reference may be had to the following U.S. patents which are in the same field:

| U.S. Pat. No. | Issued |
| --- | --- |
| 4,771,803 | 20 Sep. 1988 |
| 4,791,953 | 20 Dec. 1988 |
| 4,795,133 | 3 Jan. 1989 |
| 4,815,704 | 28 Mar. 1989 |
| 4,838,312 | 13 June 1989 |

FIELD OF THE INVENTION

My present invention relates to a shutoff and control valve which can be used for pipelines having a pressure-type housing and pipe fittings at inlet and outlet sides of this housing, between which a valve element is displaceable.

The invention is applicable to a variety of shutoff and control valves including so-called ball valves in which the valve element is a ball, cocks of similar construction, gate valves and slide valves. The term "control valve" is used here to refer to valves which can effect fine control of a fluid flow and usually are applied in control circuits.

BACKGROUND OF THE INVENTION

Shutoff and control valves of the aforedescribed type, as will be apparent from the aforementioned patents and applications and German patent No. 3,724,100 and German open application DE-OS No. 37 31 754, can have a valve element and a valve seat with which that element cooperates and against which that element moves, which may be composed of an engineering ceramic, frequently referred to as a sinter ceramic, to minimize wear, especially where the fluid is an aggressive or corrosive medium, or entrains abrasive particles therewith.

It has been observed in practice, that a valve of this type frequently suffers a certain degree of adhesion of the movable valve element to the valve seat, such adhesion depending upon the fluid medium traversing the valve and being especially pronounced when the valve element is to be moved from a defined rest position into another defined position.

Indeed, and surprisingly, this adhesion is especially a problem when these parts in contact with one another have previously been lapped or honed to improve their surface finishes and hence the sealing effectiveness of the contact between the surfaces.

As a general matter, therefore, where the two ceramic parts must move relatively and have extremely low surface roughness and have been fabricated to extremely low tolerances with respect to roundness, planarity or the like, the adhesion is especially pronounced.

The source of this adhesion has not been well researched. The adhesion tends to damage valves, especially control valves, because it requires the application of relatively high valve-positioning forces to move the movable valve element and causes deterioration of servomotors and servotransmissions if they are not diminished to be able to supply the relatively large forces required. Of course, if the servomotors and transmissions are diminished to supply the requisite valve-shifting forces, relatively large servocontrol units may result, thereby increasing the capital cost of the system.

Since engineering ceramics are relatively brittle, the valve setting forces, on occasion, may be sufficient to rupture the ceramic elements.

OBJECTS OF THE INVENTION

It is, therefore, the principal object of the present invention to provide a valve, especially a shutoff valve or a control valve of the type described, so that detrimental adhesion of the movable valve element to a valve seat engaged thereby or the valve seats engaged thereby will no longer arise.

Another object of this invention is to provide a valve which overcomes the drawbacks described previously of earlier valve systems.

SUMMARY OF THE INVENTION

These objects and others which will become apparent hereinafter are attained, in accordance with the invention, by providing the movable valve element on the one hand and the or each of the stationary valve elements or seats on the other hand of different engineering ceramic materials which are paired between the materials in contact with one another so as to reduce or eliminate the adhesion force.

I have found, most surprisingly, that while two low-roughness surfaces of the same engineering ceramic will develop the detrimental adhesion between them, when different engineering ceramics are paired in contact, the detrimental adhesion practically is eliminated.

For example, one of the paired materials can be an oxidic ceramic while the other is a carbidic or nitridic material. One of the paired workpieces may be a carbidic ceramic while the other is a nitridic ceramic. An oxidic ceramic, of course, is an oxide and preferably is selected from the group which consists of zirconium oxide and aluminum oxide.

The carbidic material is a carbide such as silicon carbide.

A nitridic material is a nitridic ceramic such as silicon nitride. Mixtures of oxides can be used in the oxide ceramic and mixtures of carbides and nitrides respectively in the carbide and nitride ceramics.

It has been found to be especially advantageous to pair materials in contact with one another which have different hardnesses.

From a phenomenological view point, I have discovered that the detrimental adhesion can be reduced by using paired material with different dielectric constants and/or different electrical conductivities.

Especially advantageous are the pairings listed in the following table:

TABLE I

| First Valve Seat | Movable Valve Element | Second Valve Seat |
| --- | --- | --- |
| ZrO | $Al_2O_3$ | ZrO |
| $Al_2O_3$ | SiC | $Al_2O_3$ |
| $Al_2O_3$ | $Si_3N_4$ | $Al_2O_3$ |

TABLE I-continued

| First Valve Seat | Movable Valve Element | Second Valve Seat |
| --- | --- | --- |
| SiC | Al₂O₃ | SiC | set of pairings especially effective for a valve having a single valve seat, reference may be had to Table II:

TABLE II

| Movable Valve Element | Valve Seat |
| --- | --- |
| ZrO | Al₂O₃ |
| Al₂O₃ | SiC |
| Al₂O₃ | Si₃N₄ |
| SiC | Al₂O₃ |

A third set of pairings which can be used in accordance with the invention has been depicted in Table III.

TABLE III

| First Valve Seat | Movable Valve Element | Second Valve Seat |
| --- | --- | --- |
| ZrO | SiC | ZrO |
| ZrO | Si₃N₄ | ZrO |

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
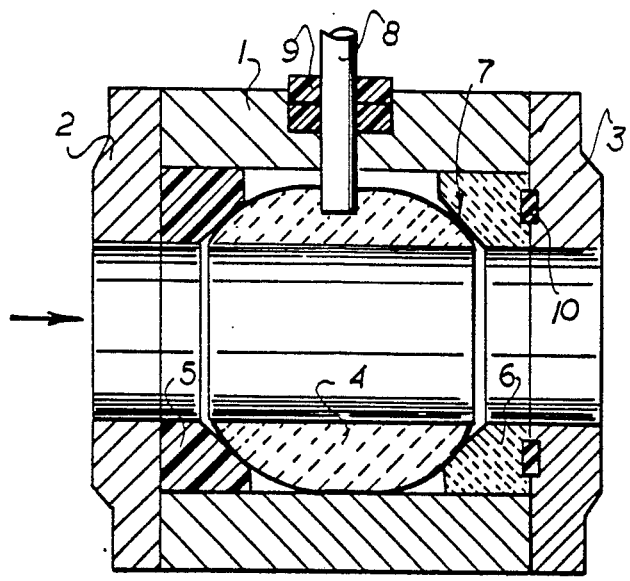
FIG. 1 is a longitudinal section through a ball valve embodying the invention shown in highly diagrammatic form.

FIG. 1 shows a ball cock which is traversed by a gaseous or liquid medium in the direction of the arrow.

This valve comprises a pressure-retaining housing 1 with an inlet side at the left and an outlet side at the right.

At the inlet side a pipe connector element 2 is provided while, at the outlet side, a pipe connector element 3 is affixed to the housing 1.

Between these pipe connector elements, a movable valve element 4 in the form of a valve ball, is located.

The valve ball 4 is rotatable by an actuating shaft or valve spindle 8 sealed by a shaft seal 9 with respect to the housing.

The ball 4 rotates in engagement with a pair of seating rings 4 and 5 so as to define a valve seat 7 for the valve as a whole. The seating rings 4 and 5 are sealingly fitted in the housing and can be clamped against the valve ball 4 by the pipe connector elements 2 and 3, and certain elastic stress being applied to the system by the compression of the elastic ring 5.

The seating ring 5 can be composed of a resilient or yieldable sealing material, for example, a polyurethane, polytetrafluoroethylene, Viton or a similar material. It can, however, also be an engineering ceramic as shown in the first valve seat column of Tables I and III, respectively.

The outlet seating ring 6 in all cases is composed of an engineering ceramic and is sealed with respect to pipe connector element 3 by a sealing ring 10. Element 10 can also be composed of an elastic material providing resilient prestress for the seating rings against the ball 4.

The ball 4 can be composed of one of the engineering ceramics listed in the center column of Tables I and III or in the left-hand column of Table II, while the engineering ceramic of the ring 3 can be composed of the materials in the right-hand column of each of the tables when the valve ball is composed of other corresponding material in the center column of Tables I and III or the left-hand column of Table II.

Figure 2:
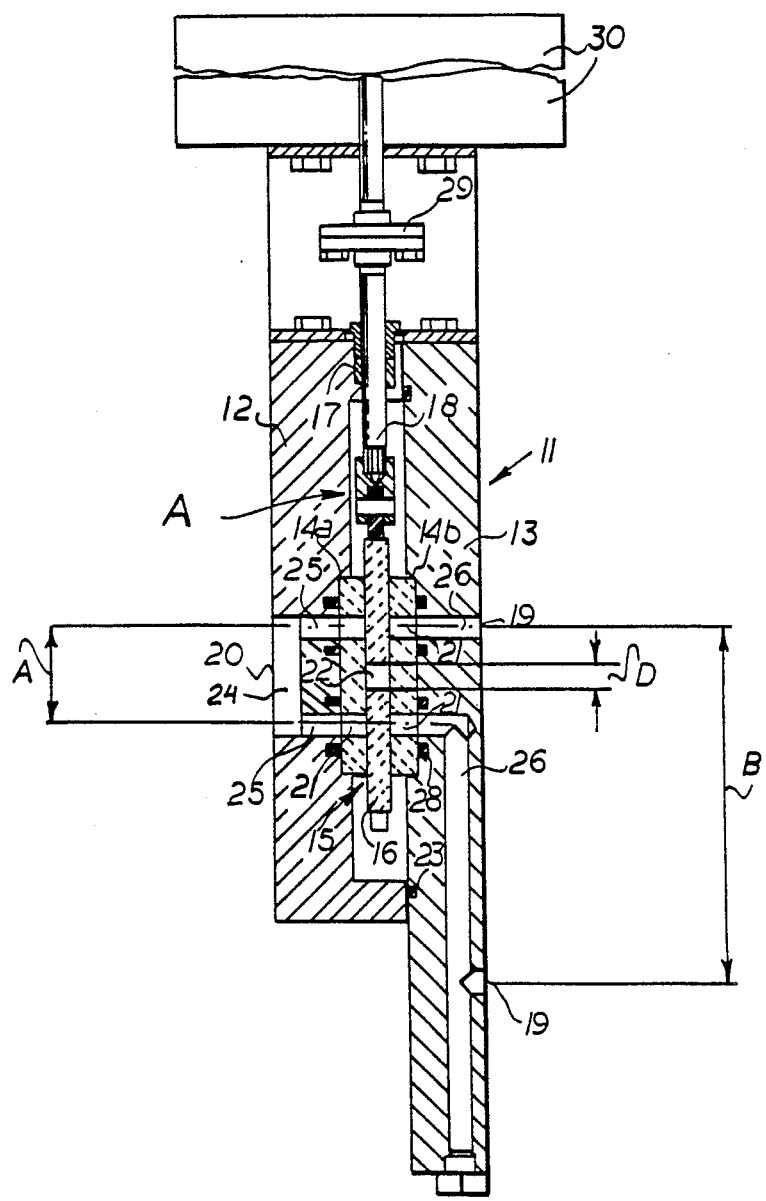
FIG. 2 is a cross sectional view through a slide valve embodying the invention.
Figure 3:
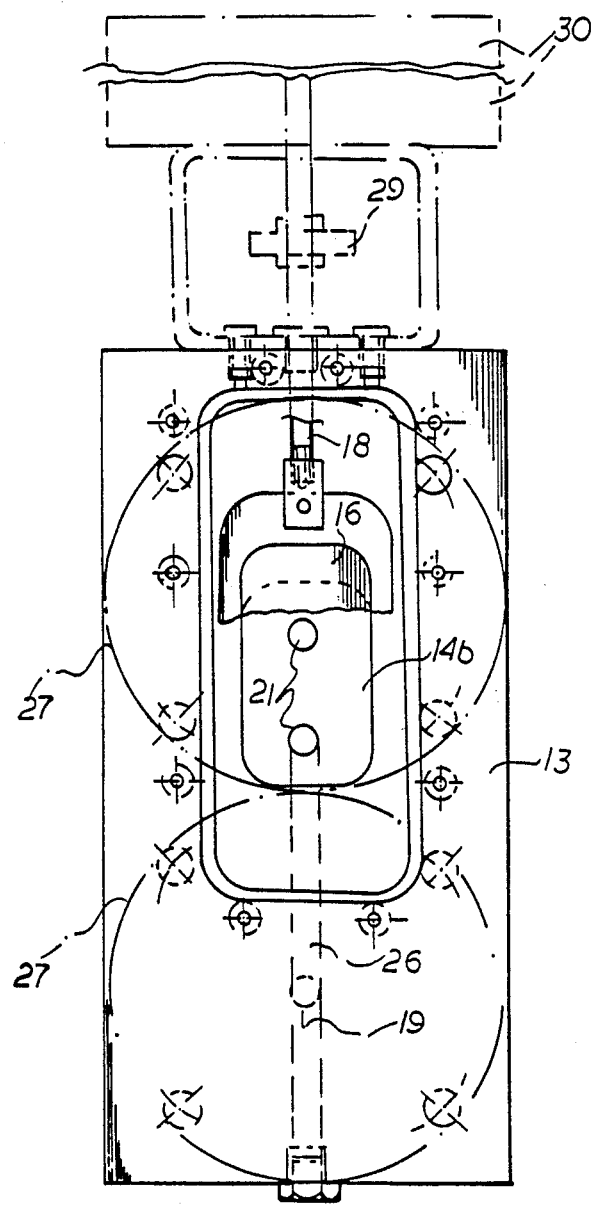
FIG. 3 is a view of the slider upon opening of the housing as seen in the direction of arrow III in FIG. 2.

In the embodiment of FIGS. 2 and 3, the movable valve member is a slider and the valve forms a slide valve.

A pressure-tight housing 11 is formed with a front housing part 12 and a rear housing part 13 pressing respective sealing disks 14a and 14b, constituting a valve seat, against the movable valve element 16 which is in the form of a slider plate. The valve element 16 is linearly displaceable by a shaft or rod 18 passing through a shaft seal 17 in the housing and operated by a servomechanism 30, for example.

The housing 11 is provided with three pipe connecting openings 19 and 20. The valve seat 15 has connecting bores registering with these openings and the valve element 16 has a throughgoing bore 22 which can be shifted to register with these openings.

In this embodiment the valve is constructed so that the two pipe-connecting openings 19 can be selectively connected on a third pipe-connecting opening by the bore 20 in the valve plate 16 when the latter is shifted into the appropriate position.

The connecting bores 21 of the valve seats 14a and 14b have a spacing A which is greater than the diameter D of the throughgoing bore 22 of the valve plate 16. As a result, the element 16 can have a further control position as can be seen from FIG. 2 in which the ports 19 and 20 are sealed from one another.

The seat 14a can be composed of any of the engineering ceramics mentioned in the left-hand columns of Tables I and III when the plate 16 is composed of an engineering ceramic from the same row of the center column and the seat 14b is composed of an engineering ceramic from the corresponding row of the right-hand column.

In the embodiment illustrated, the housing 11 is bipartite. The front housing part 12 and the rear housing part 13 are held together and against a seal 23 sealing between them, by bolts.

The seats 14a and 14b are of identical configuration.

The front housing part 11 is provided with a collecting chamber 24 which is bounded by the pipe-connecting opening 20 and communicates by bores 25 with the ports 21 in the valve seat 14a.

The rear housing part 13 is provided with flow passages 26 which connect the ports 21 of the seat 14b with associated pipe-connecting openings 19. The flow cross sections of the bores 25 of the front housing part 12 and the passages 26 in the rear housing part are identical. As can be seen from FIG. 2, the flow passage 26 in the rear housing part 13 is so arranged that the pipe-connecting openings 19 are at a distance B from one another which is greater than the distance A. The displacement of the slide 16 may be equal to A/2 from the center position shown in FIG. 2 in each direction.

As can be seen from FIG. 3, the housing parts 12 and 13 are provided with sealing surfaces and can be connected to standardized pipe flanges represented at 17.

The seats 14a and 14b are braced against the housing by elastomeric seals 28 and press with a corresponding sealing force directed against the plate 16. The seals 28 each encircle a respective connecting bore 21. Preferably the O-ring seals with round or square cross sections are used. The control distance A between the connecting bores 21 is at least twice as great as the diameter D of the throughgoing bore 22 in the plate 16.

The actuating element 18 is connected by a coupling 29 to the servomechanism or actuator 30.

In both embodiments, movement of the valve between open and closed positions or between positions controlling the fluid flow to different degrees is effected with substantially reduced adhesion by reason of the selection of the pairings of the ceramic materials.

I claim:
1. A valve comprising:
   a pressurizable housing having an inlet side and an outlet side;
   a movable valve member in said housing composed of an engineering ceramic;
   respective valve seats braced against said movable valve member and disposed in said housing at said inlet and said outlet sides, at least one of said valve seats being composed of an engineering ceramic different from that of said valve member and paired with respect to the engineering ceramic of said valve member so as to reduce adhesion between said engineering ceramics, and wherein one of said paired engineering ceramics is an oxide ceramic and the other of said engineering ceramics is selected from the group consisting of nitride and carbide ceramics.
2. The valve defined in claim 1 wherein one of the paired engineering ceramics is an oxide ceramic and the other engineering ceramic is a carbide ceramic.
3. The valve defined in claim 1 wherein one of said engineering ceramics is an oxide ceramic and the other of said engineering ceramics is a nitride ceramic.
4. The valve defined in claim 1 wherein one of said engineering ceramics is a nitride ceramic and the other of said engineering ceramics is a carbide ceramic.
5. The valve defined in claim 1 wherein said engineering ceramics have different hardnesses.
6. The valve defined in claim 1 wherein said engineering ceramics have different dielectric constants.
7. The valve defined in claim 1 wherein said engineering ceramics have different electrical conductivities.
8. The valve defined in claim 1 wherein a first of said valve seats is composed of a different engineering ceramic from that of said valve member, and a second of said valve seats is also composed of a different engineering ceramic from that of said valve member, said first and second valve seats being formed of ZrO, and said valve member being formed of $Al_2O_3$.
9. The valve defined in claim 1 wherein a first of said valve seats is composed of a different engineering ceramic from that of said valve member, and a second of said valve seats is also composed of a different engineering ceramic from that of said valve member, said first and second valve seats being formed of SiC and said valve member being formed of $Al_2O_3$.
10. The valve defined in claim 1 wherein a first of said valve seats is composed of a different engineering ceramic from that of said valve member, and a second of said valve seats is also composed of a different engineering ceramic from that of said valve member, said first and second valve seats being formed of $Al_2O_3$ and said valve member being a ceramic selected from the group consisting of SiC and $Si_3N_4$.
11. The valve defined in claim 1 wherein a first of said valve seats is composed of a different engineering ceramic from that of said valve member, and a second of said valve seats is also composed of a different engineering ceramic from that of said valve member, said first and second valve seats being formed from ZrO and said valve member being formed from a ceramic selected from the group consisting of SiC and $Si_3N_4$.
12. The valve defined in claim 1 wherein said valve member is formed from a ceramic selected from the group consisting of ZrO and SiC, and said valve seat is formed from $Al_2O_3$.
13. The valve defined in claim 1 wherein said valve member is formed from $Al_2O_3$, and said valve seat is selected from the group consisting of SiC and $Si_3N_4$.
14. The valve defined in claim 1 which is designed as a shutoff and control valve for fluid flow.

* * * * *